United States Patent [19]

Burdick et al.

[11] 4,149,181
[45] Apr. 10, 1979

[54] SIGNAL-DEPENDENT CHROMINANCE SUBCARRIER FILTERING CIRCUIT

[75] Inventors: Kenneth J. Burdick, Wyoming; Wilfred L. Hand, Clarence; Arthur H. Klein, Attica; Charles B. Neal, Batavia, all of N.Y.

[73] Assignee: GTE Sylvania Incorporated, Stamford, Conn.

[21] Appl. No.: 830,219

[22] Filed: Sep. 2, 1977

[51] Int. Cl.$^2$ ............................................. H04N 9/535
[52] U.S. Cl. .......................................... 358/31; 358/39
[58] Field of Search .............................. 358/31, 39, 21

[56] References Cited
U.S. PATENT DOCUMENTS 3,938,179  2/1976  Amery .................................. 358/31
3,969,757  7/1976  Amery .................................. 358/31

Primary Examiner—Richard Murray
Attorney, Agent, or Firm—John A. Odozynski

[57] ABSTRACT

A method and circuit for detecting and removing chrominance signal components from the luminance channel of a television receiver is shown. The luminance channel is separated into distinct subchannels, one of which has a filter providing attenuation at the chrominance subcarrier frequency. A detection circuit operates to select the output of the filtered subchannel whenever a chrominance subcarrier signal appears in the luminance channel. The detection circuit is sensitive to the phase relationship between the chrominance signal and a portion of the luminance signal and is therefore substantially immune to signals other than chrominance subcarriers, including high frequency components of the luminance signal.

14 Claims, 3 Drawing Figures

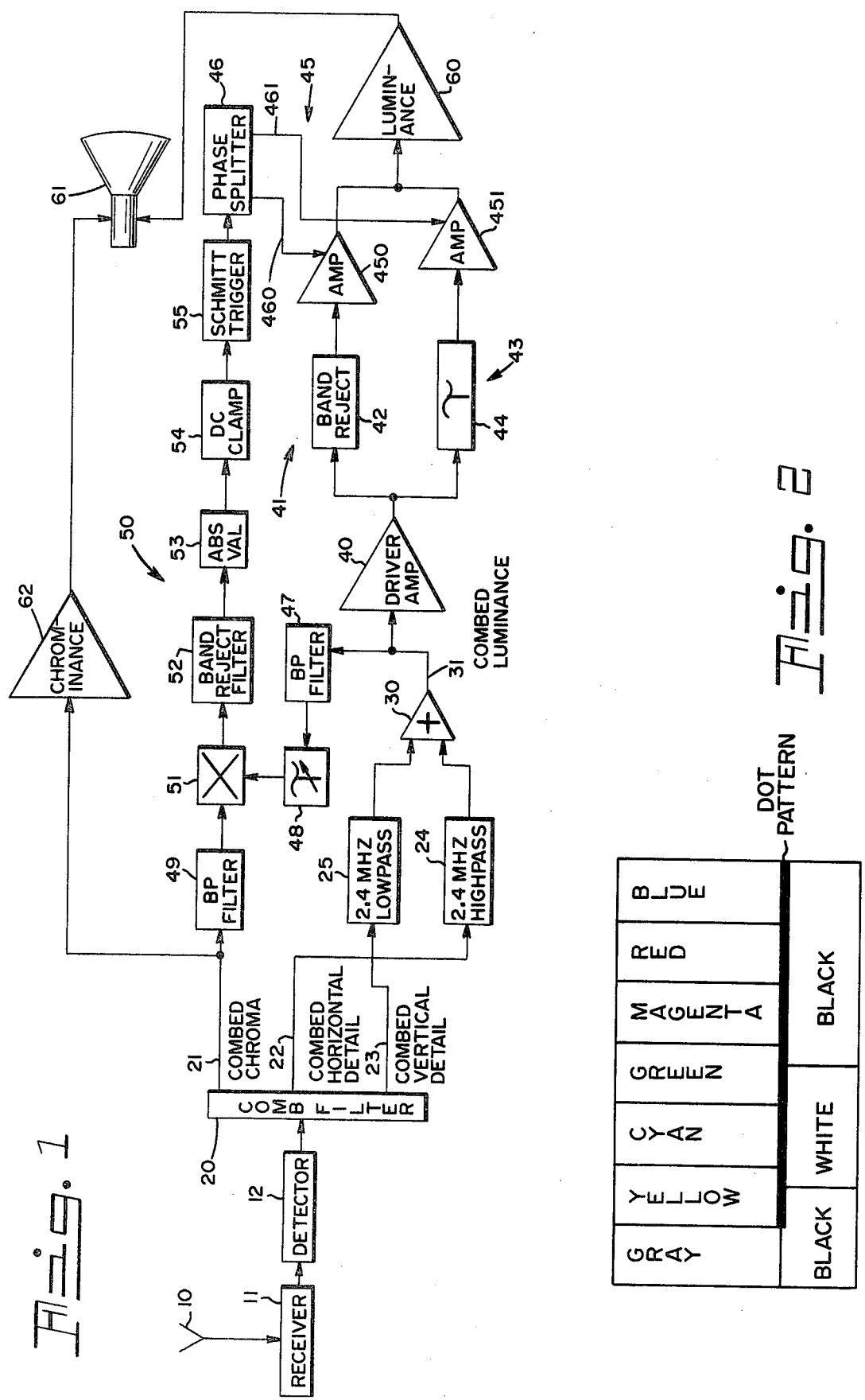

SIGNAL-DEPENDENT CHROMINANCE SUBCARRIER FILTERING CIRCUIT

FIELD OF THE INVENTION

This invention relates to video circuitry for television receivers and more particularly to a method and circuitry for detecting and removing undesired chrominance signal components from the luminance channel.

BACKGROUND OF THE INVENTION

The degree of resolution or detail attainable in a reproduced television image ordinarily is limited, not by the transmitted signal, but by the bandwidth of the receiver's luminance channel. As is well known, in the NTSC system luminance information occupies the low frequency portion of the video channel. The high frequency portion is shared by frequency-interleaved luminance and chrominance signal components. Luminance components in this frequency portion represent fine detail in pictures. In conventional television receivers, the luminance bandwidth is typically limited to a range of approximately 2.5 to 3 MHz. A significant improvement in resolution can be obtained by extending the luminance bandwidth to, say, 4 MHz. However, extending the luminance channel bandwidth can result in interference from and beats with chrominance signal components.

D. H. Pritchard et al, describe a system that uses comb filters to remove chrominance signal components from the luminance channel (D. H. Pritchard, A. C. Schoeder, and W. G. Gibson, "A High Performance Television Experiment", "IEEE Transactions on Broadcast and Television Receivers", Vol. 18, No. 2, pp. 82-90 May (1972). Comb filters are especially attractive in such an application because they can be synthesized to have frequency response characteristics corresponding to the interleaved spectra of the NTSC luminance and chrominance signals.

However, comb filtering is for the most part a time domain operation relying on the substantially constant amplitude and phase of the filtered signal on horizontal lines adjacent in time. Consequently, perturbations in the chrominance subcarrier phase or amplitude, such as those that occur during vertical color transistions, will prevent complete cancellation of the chrominance subcarrier. As a result, some unfiltered chrominance signal will be present in the luminance channel. The unfiltered chrominance will cause an objectionable dot pattern to appear in the reproduced television image.

OBJECTS OF THE INVENTION

Accordingly, it is an object of this invention to provide a relatively wide luminance channel for a television receiver.

It is a further object of this invention to eliminate interference between the luminance and chrominance signals.

It is a further object of this invention to prevent the appearance of a spurious dot pattern in the reproduced television image.

It is a further object to eliminate such interference and dot patterns while maintaining the superior performance features of a relatively wide bandwidth luminance channel.

SUMMARY OF THE INVENTION

The above and other objects and advantages are achieved in one aspect of this invention by a signal-dependent chrominance subcarrier filter circuit having a luminance channel comprising a first subchannel with a filter and a second subchannel with a time delay. A detection circuit responsive to the relative phase and amplitude of the chrominance signal and a portion of the luminance signal provide a control input to a gating means which has signal inputs provided by the outputs of the aforementioned first and second subchannels.

The above and other objects and advantages are achieved in another aspect of this invention by a method for removing chrominance subcarrier components from the luminance channel. The luminance channel is separated into distinct subchannels, one of which has a filter providing attenuation at the chrominance subcarrier frequency. The outputs of the luminance subchannels are coupled to a gating means controlled by a detection circuit having the chrominance signal and a portion of the luminance signal as its inputs.

BRIEF DESCRIPTION OF THE DRAWINGS

FIG. 1 is a schematic, in block form, of a signal-dependent chrominance subcarrier filter circuit in accordance with this invention.

FIG. 2 is a representation of a color television test pattern exhibiting substantial color variations in the vertical direction.

DETAILED DESCRIPTION OF THE PREFERRED EMBODIMENTS

Figure 3:
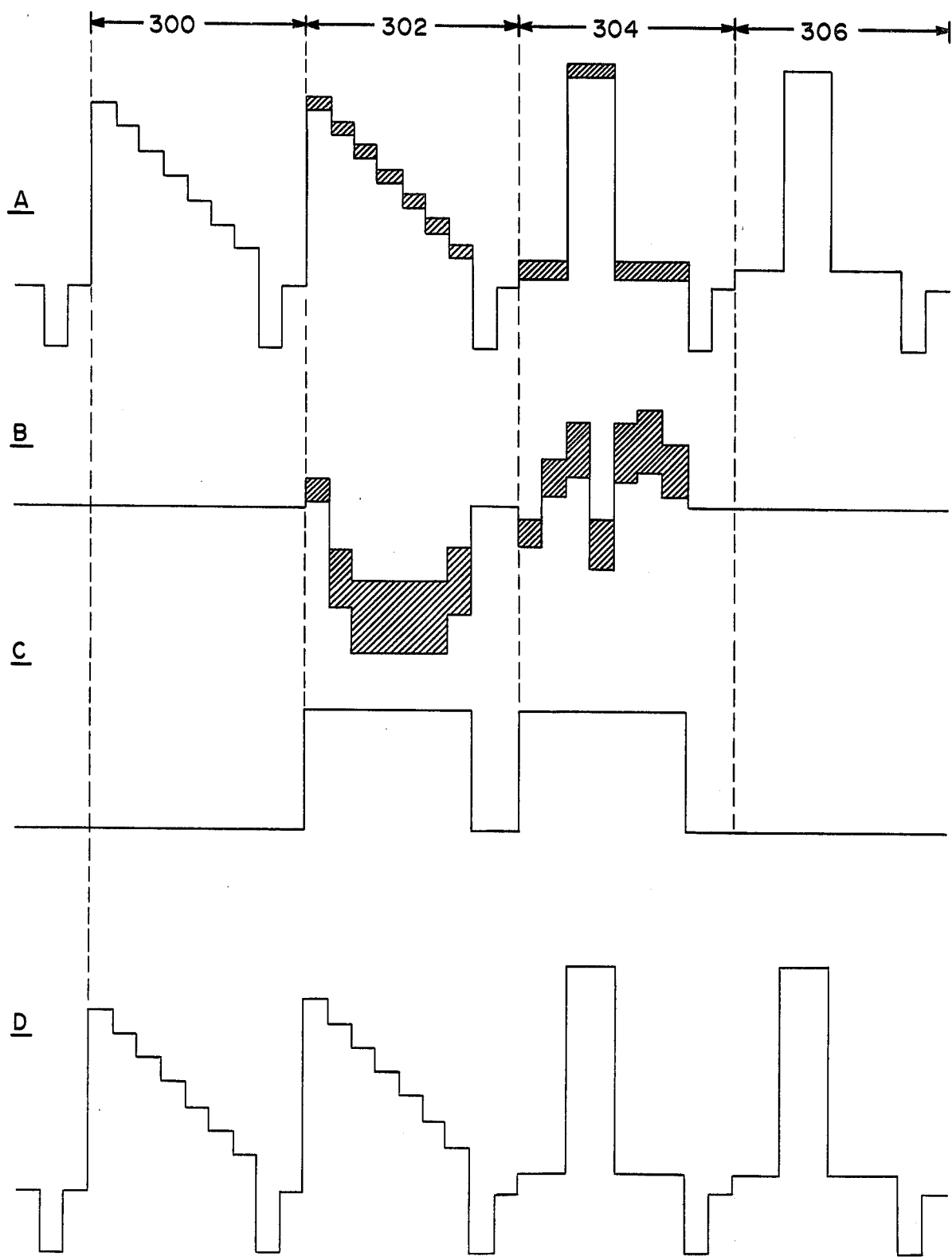
FIG. 3 illustrates waveforms as they occur at particularly relevant points in the circuit of this invention.

For a better understanding of the present invention, together with other and further objects, advantages and capabilities thereof, reference is made to the following disclosure and appended claims in connection with the above description of some of the aspects of the invention.

As illustrated in FIG. 1, an antenna 10 intercepts a radio-frequency (RF) carrier signal modulated by a composite video signal containing chrominance, luminance, and synchronization information. The RF signal is coupled to a signal receiver 11 which filters, amplifies, and converts the RF signal to an intermediate frequency (IF) typically of 45.75 MHz. The IF signal is coupled to a detector 12 which demodulates the IF signal and couples the demodulated composite signal to a comb filter 20.

Comb filters are well known in the prior art. A detailed description of one form of comb filter that may be used in conjunction with this invention is provided by R. R. Brooks and W. J. Cosgrove, "Combed Aperture Equalization for Color Television Cameras", JOURNAL OF THE SMPTE, Vol. 79, pp. 21-25 (1970). Comb filter 20 provides a combed chroma output 21 and a combed luminance output 31.

In an embodiment of a comb filter particularly useful for enhancing both the horizontal and vertical detail of the reproduced television image, the combed luminance output may be obtained as shown in FIG. 1. The comb filter 20 develops a combed horizontal detail signal at a terminal 22 and a combed vertical detail signal at a terminal 23. These signals are respectively coupled to a highpass filter 24 and a lowpass filter 25, having substantially equal cutoff frequencies at approximately 2.4

MHz. The outputs of filters 24 and 25 are combined in a summing amplifier 30 to provide the combed luminance output 31. The combed luminance output is coupled to a driver amplifier 40. Driver amplifier 40 provides the luminance signal to a first subchannel 41 comprising a filter 42 and to a second subchannel 43 comprising a time delay 44. For the purposes of this embodiment, filter 42 may be considered to be a band reject filter with a nominal center frequency at the chrominance subcarrier frequency, 3.58 MHz. However, it will be apparent that a lowpass filter with a cutoff frequency below 3.58 MHz also will be effective. The essential characteristic of filter 42 is that it provides a greater amount of attenuation at the chrominance subcarrier frequency than at frequencies below it, thereby reducing the proportion of chrominance subcarrier signal in the luminance channel. Time delay 44 is required to compensate for the delay introduced by the filter. The outputs of the first and second luminance subchannels are coupled to the signal inputs of a gating means 45 comprising a phase splitter 46 and amplifiers 450 and 451.

Again, in referring to comb filter 20, the combed chroma output 21 is coupled through a bandpass filter 49 to a first input of a detection circuit 50. The combed luminance output 31 is similarly coupled through a bandpass filter 47 to a phase-compensating element in the form of a variable time delay 48. The output of time delay 48 is coupled to a second input of the detection circuit 50. For the purposes of this embodiment, filters 49 and 47 have a nominal center frequency at the chrominance subcarrier frequency, 3.58 MHz, and a bandwidth of approximately 1 MHz. Delay 48 is used to establish the desired relative phase relationship of the input signals to the detector circuit 50. Detection circuit 50 comprises a multiplier 51, a band reject filter 52, an absolute value circuit 53, a DC clamp 54 and a switching circuit 55, illustrated as a Schmitt trigger. The output of the detection circuit, that is, the output of Schmitt trigger 55, is coupled to the control input of gating means 45. In a manner to be precisely described below, the output of the detection circuit 50 determines which of the luminance subchannels appears at the output of gating means 45. The output of gating means 45 is coupled through a luminance amplifier 60 to a cathode ray tube 61. Similarly, the combed chroma output 21 is coupled through a chrominance processor 62 to cathode ray tube 61.

As is known to those skilled in the art, comb filters can be used to synthesize desired frequency response characteristics by performing time domain operations on input signals. In particular, by variously combining an input signal with the appropriate time-delayed versions of itself, the familiar comb-shaped frequency response characteristic can be obtained. For example, the combed chroma output 21 is obtained by adding the composite video signal to a version of itself that has been delayed 1 H, where H is one horizontal line period or approximately 63.5 microseconds ($\mu$ Sec.). The resulting frequency response characteristic has nulls at integral multiples of the horizontal line frequency and peaks at odd integral multiples of one-half the horizontal line frequency. The combed vertical detail signal is similarly obtained but has peaks at integer multiples of the horizontal line frequency. The synthesis of the combed horizontal detail signal is somewhat more involved and, since it is not required for a thorough understanding of this invention, its discussion has been left to the article by Brooks and Cosgrove, cited above. Its frequency response characteristics has nulls at the chrominance subcarrier frequency, 3.58 MHz, and at integer multiples of the horizontal line frequency around it; that is, 3.58 MHz $\pm$ 15.75 MHz, $\pm$ 2 $\times$ (15.75 KHz), $\pm$ 3 $\times$ (15.75 KHz), etc. From this it is clear that the combed chroma output has nulls at precisely those frequencies corresponding to the spectral content of the luminance signal. Conversely, the combed luminance output has nulls at precisely those frequencies corresponding to the spectral content of the chrominance signal. In this manner, the use of a comb filter allows a wideband luminance channel to be incorporated into the design of the television receiver without introducing undesirable interference with or beats from the chrominance signal.

However, because comb filtering is a time-domain operation, it will be ineffective in removing chrominance information from the luminance channel whenever the amplitudes and/or phase of the chrominance subcarrier is different from amplitude and/or phase existing during the corresponding portion of the preceding horizontal line period. Such a change in the subcarrier amplitude or phase is the result of a chrominance transition, of either saturation or hue, in the vertical direction of the reproduced image. FIG. 2 is an example of a commonly used test pattern containing chrominance saturation transitions in the vertical direction. It can be seen that eight vertical chrominance saturation transitions occur along the heavy black reference line: Yellow to Black, Yellow to White, Cyan to White, Green to White, Green to Black, Magenta to Black, Red to Black, and Blue to Black. During two horizontal lines in a field, one immediately preceding and one immediately subsequent to the chrominance transitions, the comb filter will be unable to remove chrominance subcarrier signal from the luminance channel. This results from the fact that a change in chrominance saturation is effected by modulating the amplitude of the chrominance subcarrier. When the amplitudes of the original and time-delayed (1 H) inputs to the comb filter are unequal, it is impossible for complete cancellation to occur. Similarly, a change in hue is effected by modulating the phase of the chrominance subcarrier. This finite phase shift is equivalent to an incremental time delay in the comb filter circuit. As a result the filter is again unable to provide complete cancellation of the 3.58 MHz subcarrier.

The presence of the chrominance subcarrier in the luminance channel produces a finely structured dot pattern in the reproduced image. The dot spacing is on the order of ten per inch on a 25-inch screen. It is particularly annoying when, as in FIG. 2, it persists for nearly the entire length of the raster. Because there are two uncombed lines per field, there will be four uncombed lines during each frame containing a vertical chrominance transition.

An obvious method of removing the objectionable dot pattern would be to insert a 3.58 MHz band reject filter in the luminance channel. However, because this filter would remove some of the high frequency components of the luminance signal that the wideband luminance was intended to preserve, it is desirable to provide such filtering only at those times when there is, in fact, a component of the chrominance subcarrier in the luminance channel. Furthermore, the luminance signal often will have components at or around the chrominance subcarrier frequency. Consequently, a scheme that operates to detect a signal at 3.58 MHz would be likely to respond to high frequency luminance signals and would, therefore, be inadequate. Detection circuit 50 detects the presence of an undesired chrominance signal in the luminance channel and provides the appropriate control signal to phase splitter 46 of gating means 45. The outputs of luminance subchannels 41 and 43 are coupled to the signal inputs of amplifiers 450 and 451 respectively.

As shown in FIG. 1, luminance subchannel 41 includes a band reject filter 42 having maximum attenuation at 3.58 MHz. The filter removes 3.58 MHz signal from the luminance channel. An alternate subchannel 43 provides an unfiltered signal, thereby maintaining the desired wide luminance bandwidth. The detection circuit 50 operates in response to the signal content in the high frequency detail portion of the luminance signal. When a component of the 3.58 MHz chrominance subcarrier is detected in the luminance signal channel, the detection circuit provides a control voltage to gating means 45 so that the filtered luminance signal passes to the luminance amplifier. During times when there is no chrominance signal in the luminance channel, the unfiltered signal is allowed to pass to the luminance amplifier.

The operation of the detection circuit is as follows. The combed chroma output is coupled through bandpass filter 49 to a first input of the multiplier 51. The multiplier is of conventional design and may be, for instance, a Motorola integrated circuit type MC1496. The combed horizontal detail output 22 is also coupled through a bandpass filter 47 and variable time delay 48 to a second input of multiplier 51. The bandpass filters are introduced to limit the effects of detail generated by diagonal lines in the picture and luminance transitions that occur during the chrominance transitions.

As is well known, multipliers provide an output proportional to the amplitude and to the cosine of the difference in phase of the signals present at its input. For a given amplitude input signals to the multiplier, its output will have a maximum absolute value when the input signals are equivalent in frequency and either in phase or 180° out of phase. Although ideal multipliers provide an output at frequencies equal to the sum and difference frequencies of the input signals, practical multipliers are likely to allow some direct feedthrough of the input signals. Band reject filter 52 substantially reduces any component of the chrominance subcarrier present at the multiplier output, thereby eliminating the possibility of Schmitt trigger 35 being spuriously triggered by a 3.58 MHz signal.

Because the multiplier 51 will provide outputs of both polarities, depending on relative phases of the input signals, and because the Schmitt trigger used in the described embodiment is responsive only to positive polarity input signals, an absolute value circuit 53 is used to invert negative polarity signals. The DC clamp 54 sets the operating threshold of the Schmitt trigger 55.

The waveforms depicted in FIGS. 3A, B and C are simplified representations of signal waveforms occuring during two lines immediately preceding and two lines immediately subsequent to a vertical chrominance transition. For the purposes of illustration, it is assumed that waveforms occur during an even field and represent lines 300, 302, 304, 306. The transition occurs between lines 302 and 304.

FIG. 3A is the waveform at the output 31 of combed luminance amplifier 30. The shaded areas on lines 302 and 304 represent the uncombed chrominance subcarrier superimposed on the luminance signal.

The combed luminance is filtered, passed through the time delay 48, and applied to an input of multiplier 51. The combed chrominance output 21 of comb filter 20 is similarly filtered and applied to the other input of multiplier 51.

FIG. 3B shows the multiplier output. Note that, depending on the relative phases of the 3.58 MHz signals in the combed chroma and horizontal detail output, the multiplier output makes positive and negative excursions about a reference level. The amplitude of the multiplier output signal is dependent on the amplitudes of the combed chroma and horizontal detail signals, as well as their relative phases. Time delay 48 determines the relative phases of the multiplier inputs. It is adjusted to maximize the multiplier output in response to the appearance of the horizontal dot pattern arising from the unfiltered chrominance subcarrier in the luminance channel. In this manner the phase-sensitive characteristics of the multiplier are utilized to discriminate between high-frequency luminance components and chrominance signal components in combed luminance output. High-frequency luminance components, including those at or near 3.58 MHz, will have a random phase relationship to the chrominance subcarrier. As a result, the output of multiplier will not be of sufficient amplitude to trigger Schmitt trigger 53. However, chrominance components in the combed luminance will be substantially phase coherent with the chrominance signal in the combed chroma output. The resulting multiplier output will trigger Schmitt trigger 55.

FIG. 3C represents the output of Schmitt trigger 55. It provides a positive logic level voltage of a predetermined minimum amplitude, i.e., a logical ONE, whenever an uncombed chroma signal is detected in the luminance channel.

Phase splitter 46 provides two complementary outputs, 460 and 461, to the enabling inputs of amplifiers 450 and 451 in response to the output of Schmitt trigger 55. Whenever the output of Schmitt trigger 55 is a logical ONE, output 460 will be a voltage of magnitude and polarity required to enable amplifier 450; otherwise it will be effectively zero. Conversely, whenever the output of the Schmitt trigger is a logical ZERO, output 461 will enable amplifier 451.

Because the outputs of phase splitter 56 are complementary, only one amplifier will be enabled at a given time. The outputs of amplifiers 450 and 451 are connected in parallel so that the input to the luminance amplifier is the filtered combed luminance signal whenever the chroma subcarrier is detected. During those times when the chrominance subcarrier is absent from the combed luminance signal, the input to luminance amplifier 60 is the unfiltered combed luminance signal. FIG. 3D shows the input to the luminance amplifier 60. Note the removal of the chrominance signal from lines 302 and 304.

In a system incorporating a comb filter such as the one described above, an alternative method is available for detecting uncombed chrominance information in the combed luminance output. Instead of coupling the combed luminance signal, it is possible to couple only the combed horizontal detail signal (present at terminal 22) through filter 47 to an input of the multiplier 51. The multiplier would then be sensitive to the relationship between the combed chrominance signal and a portion of the combed luminance signal. This is advantageous in the respect that the combed horizontal detail contains the information relevant to the operation of the filtering circuit. Including the combed vertical detail signal is undesirable to the extent that it might cause the filter circuit to be activated as a result of luminance signal transitions.

It is worth noting that although the chrominance subcarrier filtering circuit has been described in relation to a particular type of comb filter it is equally useful with other types of comb filters, as well as in systems that do not require comb filters. This utility arises from the fact that the circuit is sensitive to the chrominance and luminance signals as they exist on one given line at a particular point in time. This is clearly superior to a system which compares two horizontal lines to detect a chrominance transition. Obviously, such a system requires at least one, and probably, more than one delay line. Furthermore, it presupposes that a vertical chrominance transition has resulted in the appearance of the chrominance signal in the luminance channel. This may not necessarily be the case.

Accordingly, a preferred method of removing components of the chrominance subcarrier signal from the luminance channel has been illustrated and described. The method filters the luminance signal in response to detected chrominance subcarrier. In the absence of chrominance components, the luminance signal is maintained intact. Furthermore, the presence of luminance signal components at or near the color subcarrier frequency will not result in the undesirable reduction in the luminance channel bandwidth.

While there has been shown and described what is at present considered the preferred embodiment of the invention, it will be obvious to those skilled in the art that various changes and modifications may be made therein without departing from the scope of the invention as defined by the appended claims.

What is claimed is:

1. In a television receiver having a composite video channel being the sum of a chrominance channel and a luminance channel, and the luminance output being separated from said video channel, a method for removing chrominance subcarrier components from said luminance channel output comprising the steps of:
   separating said luminance channel into distinct subchannels comprising a first subchannel having a filter providing an amount of attenuation at the chrominance subcarrier signal frequency that is greater than that provided at frequencies below it,
   applying the outputs of said subchannels to the signal inputs of a gating means,
   applying the chrominance signal to a first input of a detection circuit and a portion of the luminance signal through a phase-compensating element to a second input of said detection circuit, and
   coupling the output of said detection circuit to a control input of said gating means so that the output of said gating means is representative of the output of said first subchannel whenever the output of said detection circuit is at a first predetermined logic level.

2. A method for removing chrominance signal components from a luminance signal channel as defined in claim 1, wherein said filter is in the form of a band reject filter having maximum attenuation at the chrominance subcarrier signal frequency.

3. A method for removing chrominance signal components from a luminance signal channel as defined in claim 1, wherein said subchannels comprise a second subchannel having a time delay compensating for the delay of said filter.

4. A method for removing chrominance signal components from a luminance signal channel as defined in claim 3, wherein the output of said gating means is representative of the output of said second subchannel whenever the output of said detection circuit is at a second predetermined logical level.

5. A method for removing chrominance subcarrier signal components from said luminance channel as defined in claim 1, wherein the output of said detection circuit is at first predetermined logic level whenever the inputs to said detection circuit are of substantially the same frequency and substantially phase coherent.

6. A method for removing chrominance subcarrier signal components from said luminance channel as defined in claim 1, wherein said portion of the luminance signal is applied to said second input of said detection circuit through a variable time delay for establishing the relative phase relationship between said portion of the luminance signal and said chrominance signal.

7. A signal-dependent chrominance subcarrier filter circuit comprising:
   a luminance channel having a first subchannel comprising a filter circuit with a nominal frequency at the chrominance subcarrier signal frequency and a second subchannel comprising a time delay,
   a detection circuit having a first input signal consisting of the chrominance signal and a second input signal consisting of a portion of the luminance signal, said detection circuit responsive to the relative phase and frequency of said first and second input signals, and
   a gating means having a control input provided by the output of said detection circuit and signal inputs provided by the respective outputs of said first and second subchannels.

8. A signal-dependent chrominance subcarrier filter circuit as defined in claim 7, further comprising a variable time delay for establishing the relative phases of said first and second input signals.

9. A signal dependent chrominance subcarrier filter circuit as defined in claim 7 wherein said gating means comprises an output and means for generating complementary signals for determining which of said input signals appear at the output of said gating means.

10. A signal-dependent chrominance subcarrier filter circuit as defined in claim 9 wherein said means for generating complementary signals is in the form of a phase-splitter having an input connected to the output of said detection circuit, one output connected to an enabling input of a first amplifier, and another output connected to an enabling input of a second amplifier, said amplifiers having inputs connected to the respective outputs of said first and second luminance subchannels.

11. A signal-dependent chrominance subcarrier filter circuit as defined in claim 10 wherein said output of said gating means consists of a parallel connection consisting of outputs of said amplifiers and wherein said amplifiers are enabled in response to said complementary signals.

12. A signal-dependent chrominance subcarrier filtering circuit as defined in claim 11 wherein said filter is a band-reject filter having maximum attenuation at 3.58 MHz.

13. A signal-dependent chrominance subcarrier filtering circuit as defined in claim 10 wherein said detection circuit comprises a multiplier whose input consists of the chrominance signal and a portion of the luminance signal and a switching circuit responsive to the output of said multiplier.

14. A signal-dependent chrominance subcarrier filtering circuit as defined in claim 7 wherein said detection circuit provides a predetermined output level whenever said chrominance signal and at least a portion of the luminance signal are substantially in phase or 180 degrees out of phase.

* * * * *